United States Patent [19]

Dikta

[11] Patent Number: 4,490,827
[45] Date of Patent: Dec. 25, 1984

[54] FEEDING ELECTRIC CURRENT TO TWIN-VESSEL ARC FURNACES

[75] Inventor: Gerd Dikta, Grefrath, Fed. Rep. of Germany

[73] Assignee: Mannesmann AG, Duesseldorf, Fed. Rep. of Germany

[21] Appl. No.: 514,573

[22] Filed: Jul. 18, 1983

[30] Foreign Application Priority Data

Jul. 8, 1982 [DE] Fed. Rep. of Germany ....... 3225514

[51] Int. Cl.³ .............................................. H05B 7/11
[52] U.S. Cl. ...................................... 373/103; 373/78
[58] Field of Search ..................... 373/78, 81, 84, 102, 373/103

[56] References Cited

U.S. PATENT DOCUMENTS 3,366,725 1/1968 Watterson ........................... 373/103
3,612,739 10/1971 Korneff ................................. 373/78
4,425,658 1/1984 Bretthauer et al. ................. 373/103

FOREIGN PATENT DOCUMENTS 3102499 1/1981 Fed. Rep. of Germany .

Primary Examiner—Roy N. Envall, Jr.
Attorney, Agent, or Firm—Ralf H. Siegemund

[57] ABSTRACT

The disclosed arrangement refers specifically to a smelting arrangement which includes two metallurgical vessels serviced by a common, electrode carrying lid which is pivoted about a vertical axis as between one or the other position in relation to the two vessels. The current feed arrangement is designed such that beginning with a bus system extending from the transformer, conductors are run in a triangular arrangement down to a first plane, in freely sagging suspension and up again to the electrodes in such a manner that the conductors undergo a slight displacement only in the vertical suspension region near the transformer, equivalent to a slight torsion of a triangular prism, while the suspended portions of the conductors remain invarient during the pivoting about an axis that runs through the center of the triangle defined by the connect points at the transformer.

3 Claims, 6 Drawing Figures

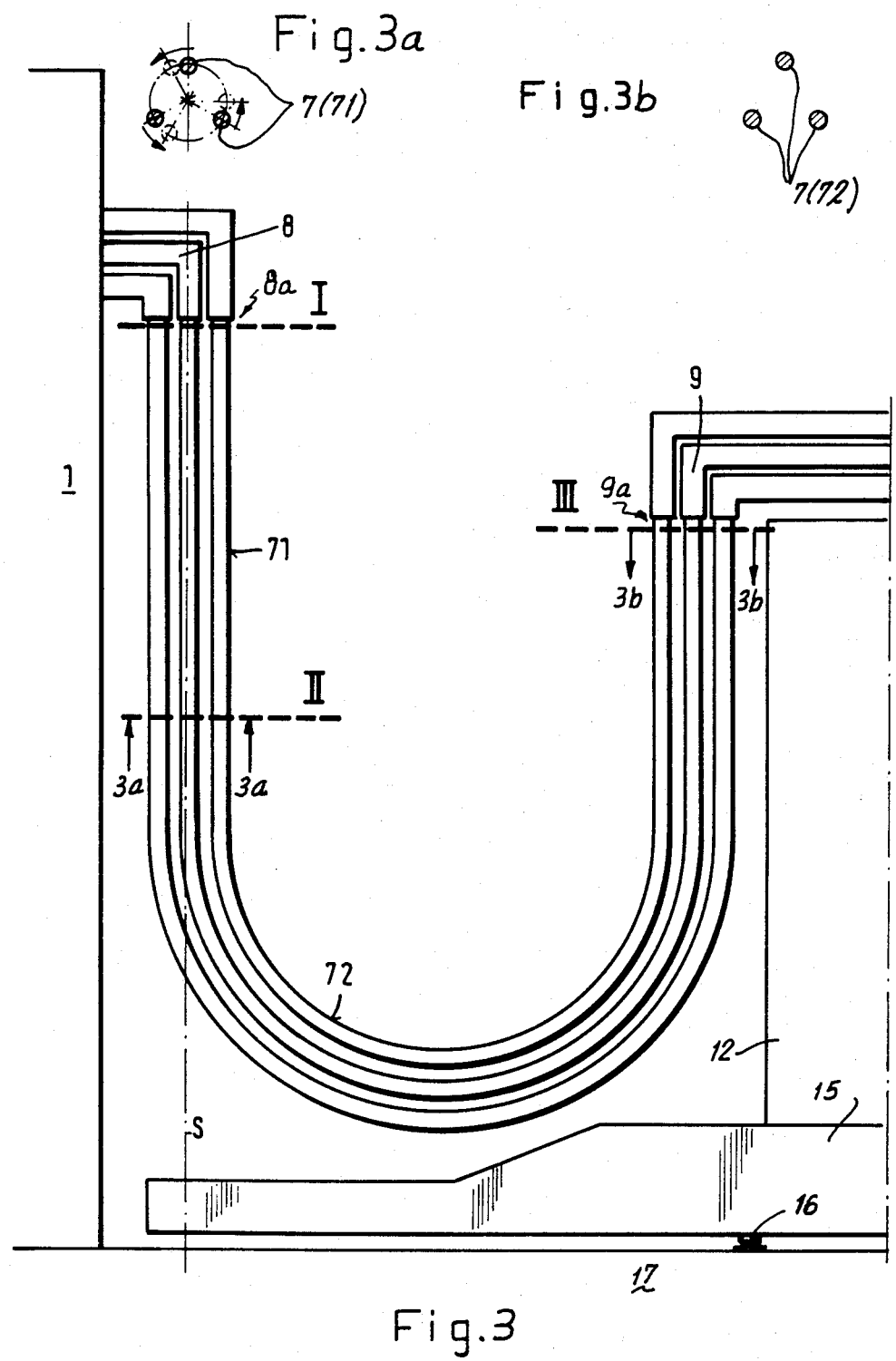

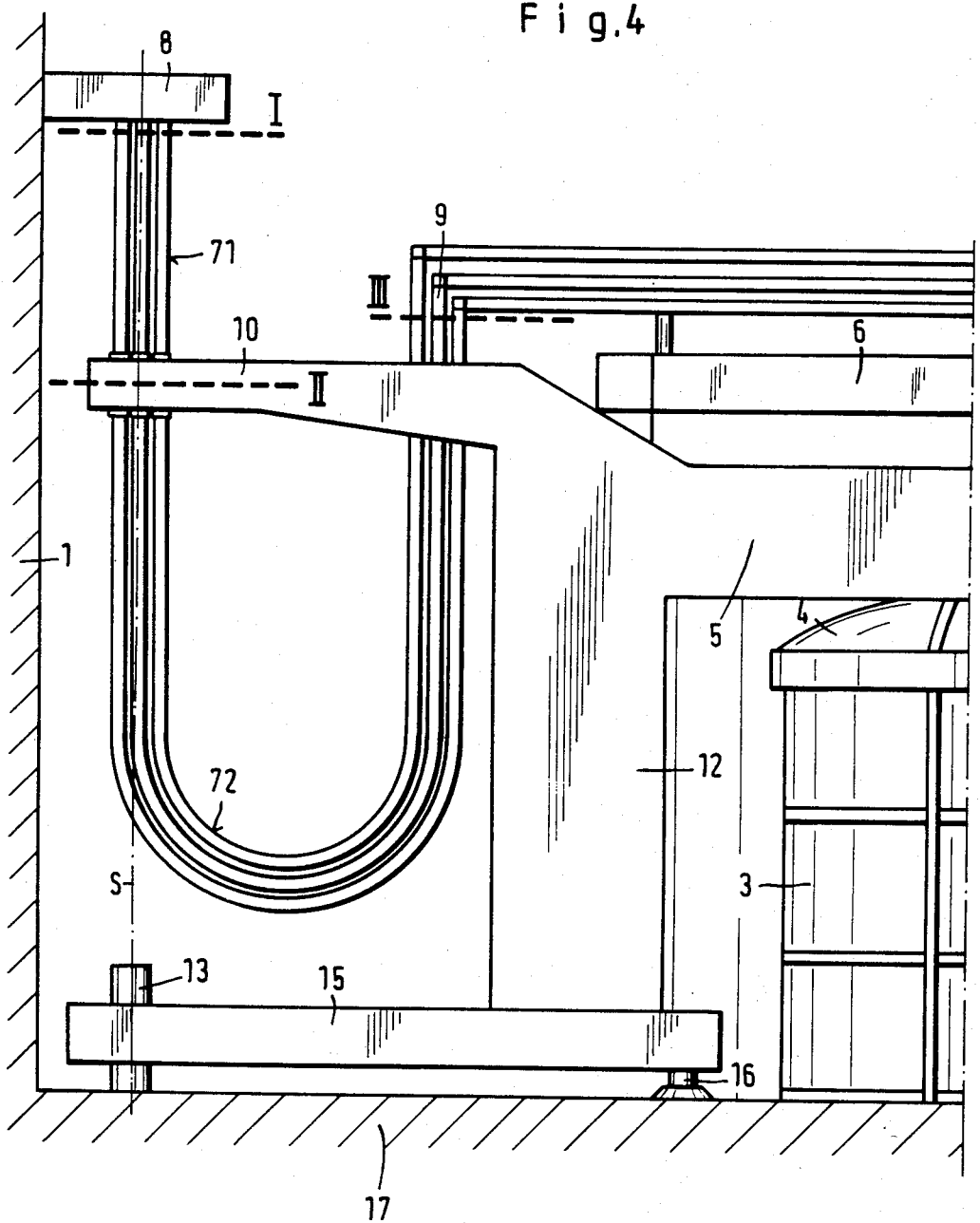

FEEDING ELECTRIC CURRENT TO TWIN-VESSEL ARC FURNACES

BACKGROUND OF THE INVENTION

The present invention relates to high current feeding for an electric arc, twin hearth furnace.

Electric smelting i.e. metallurgic furnaces, particularly arc furnaces, require the feeding of electric current to the electrodes. It has been the practice to run the conductors in partially suspended fashion from the transformer to the electrode sockets. A flexible connection is required because the electrodes are moved during the operation; particularly voltage changes require control operations which are effected by lowering or raising the electrodes, while the transformer connections remain stationary.

It is known that certain problems arise in the case of an uneven, i.e. unsymmetrical arrangement, of the three phase conductors. These problems are of a technical nature and are caused by the mutual electromagnetic interference of the conductors which run to the electrodes. In particular, during movement and displacement of the electrodes the conductors are moved accordingly, but not in unison, they therefore change their mutual position. Since this movement is not carried out in infinitisimally small steps but have a noticeable speed inductive forces are set up as between the several conductors which effectively increase the inductivity of the system as a whole and, therefore, increase the wattless power of the system. The increase in wattless power, of course, has to be covered by an increase supply of energy.

In order to match the different inductivies of the several conductors, i.e. in order to provide some form of equalization, it has been the practice to run the conductors in a so-called triangulated arrangement in order to make sure that they are mutual spacing and distance remains constant even when the electrodes are moved up or down. This has not been successfully practiced thus far. The overall problem is a twofold one: displacement of each conductor as such and a change in its geometrical configuration changes the inductance of the respective conductor path. However, any mutual position change among the conductors introduces asymmetry into the overall inductive behavior and that, ultimately, is reflected in local nonuniformities in the smelting process.

Steel smelting plants using several furnaces are sometimes provided with a common, pivotable cover or lid as is disclosed, for example, in German printed patent application No. 3102499. With regard to the requisite symmetry among the conductors, this kind of arrangement poses particular problems. The several conductors are not only displaced as such in dependence and during the adjustment of the elevation of the electrodes, but they also change their position in relation to each other upon pivoting the electrode arc. Therefore, the known rigid conductor system, as is for example disclosed in German printed patent application 3016087 is not suitable for that kind of furnace.

DESCRIPTION OF THE INVENTION

It is an object of the present invention to provide a new and improved heavy current feeding arrangement for electric arc twin hearth or twin vessel furnaces generally of the type mentioned above, wherein any change of the mutual position of the freely suspended, i.e. sagging conductors, particularly during pivoting of the electrode carriers, is prevented so as to avoid an increase in omic and inductive losses during operation.

It is a particular object of the present invention to provide a new high current feeding device which runs from a transformer to triangularly arranged electrodes mounted on a common pivotable lid for an electric arc, twin vessel furnace, wherein structure is provided for pivoting the lid about a particular axis and wherein the conductors are connected to a bus bar system of the transformer in a triangular pattern.

In accordance with the preferred embodiment of the present invention, it is suggested to run the conductors from the connect points at the transformer bus bar into sections, first essentially down in a vertically extending section leading from the point of connection to the transformer bus bar to a lower horizontal plane, each conductor section continuing and in a second section extending from the latter plane to a third plane in which the conductors are connected to a bus connector system leading to the aforementioned lid and wherein these second sections run in free and sagging suspension from the second plane to the third plane and wherein the centers of the conductors in each of said planes are arranged in a equilateral triangle, the several triangles being congruent accordingly and the sides of the triangles in the second and third plane remain parallel even during pivot motion of the electrodes about an axis which runs through the center of the triangle in at least the first plane. Moreover, that axis should also traverse the center of the triangle in the second plane and means are provided in the second plane to turn the triangle about that axis causing the conductors to follow that turning motion to thereby establish a slight torsional twist among the conductors within the space between the first and the second plane about the pivot axis while the spatial relationship of the conductors within the second section remains unaffected by such pivot motion.

It can thus be seen that during pivoting of the electrode carrier, such as a lid for the two vessels and about the aforementioned axis, any positional change among the conductors in relation to each other occurs essentially only within the vertical section extending between the first and the second plane as defined above. One can say that the three conductors establish an equilateral prism with triangular cross section, and during the pivot motion as described this prism is subjected to some torsion or twist. In view of this torsion there will be no relative motion between the conductors as suspended so to speak from the second plane to the third plane in points of laterally offset dispositions. Therefore, the triangular relationship of the three conductors as it exists in any plane extending locally transversely through the three conductors so suspended, remains invarient during the pivot motion. This geometry therefore avoids any change, particularly any increase in impendence asymmetry that may exist within the system. It is readily understood that relative movement among curved (sagging) conductors could be of significant interfering effect on the system, but the particular geometry of suspension make sure that the curved conductors will in fact pivot laterally in unison so that any mutual interference that may exist already is not modified by the pivot motion.

As stated, the only relative motion of the conductors in relation to each other occurs in the vertical section but that motion is also very minimal. Particularly if the pivot axis remains within the center of the triangle formed by the three conductors in any plane between the first and the second plane as defined, the overall deflection and particularly the maximum relative deflection of any conductor near the transformer is very minimal and is actually a higher order effect so that the interference of the conductors upon each other remains minimal indeed. In view of this same deflection, torsionable but otherwise solid conductors such as tubes could be employed for this vertical portion.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 illustrates in detail the arrangement of the conductors between the transformer and the carrier of the electrodes;

FIGS. 3a and 3b, respectively, illustrate cross sections in plane II and III as indicated in FIG. 3; and FIG. 4 illustrates a portion of the pivot arrangement with a positioning structure for the conductors.

Figure 1:
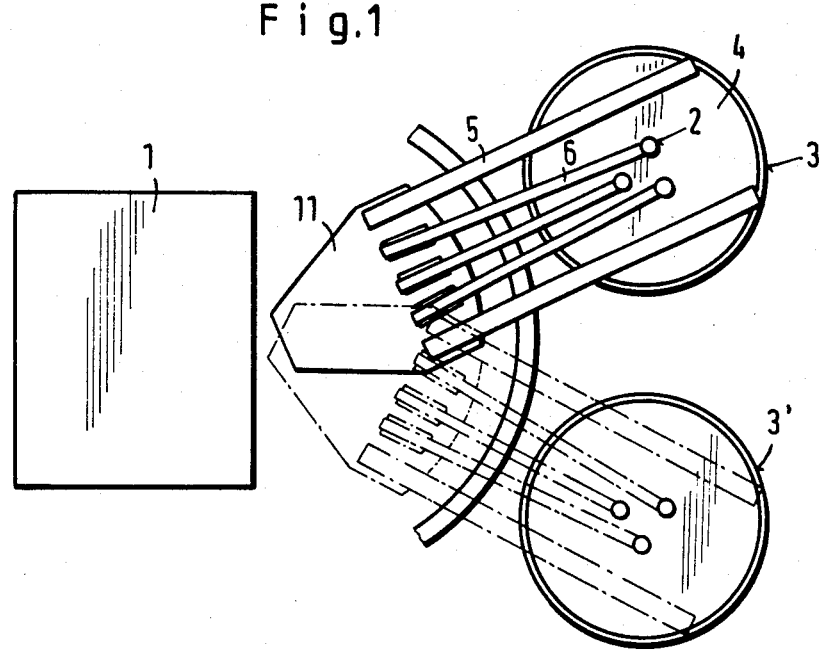
FIG. 1 illustrates in elevation an electric arc twin hearth or dual vessel furnace the conductors are concerned, running from a transformer to the electrodes in the furnace.

Proceeding now to the detailed descriptions of the drawings and turning particularly to FIG. 1, the Figure illustrates a transformer 1 and two furnace vessels 3 and 3' pertaining to a steel smelting device and being arranged on a common platform 17. A common lid or cover 4 is provided for the two vessels 3 and 3'. A common electric power supply leads to the cover 4 and is comprised of electrode arms 6. The lid is affixed to a pivot arrangement having several arms 5 which extend from a column 12. The column 12 extends in upward direction from a base plate 15 which is pivotable about the pivot axis "S". This axis S defines the center of an arch and reference numeral 16 (FIG. 4) refers to rolls by means of which base plate 15 runs on the platform 17. Reference numeral 13 defines a journal pin for the pivoting of base plate 15 about axis S. The electrode arms 6 are likewise connected through vertical column structure to the base plate 15 and therefor follow the pivot motion thereof. The furnace vessels 3 and 3' are secured to the base and platform 17 and access for removal of the smelted material is carried out through the bottom thereof.

Figure 2:
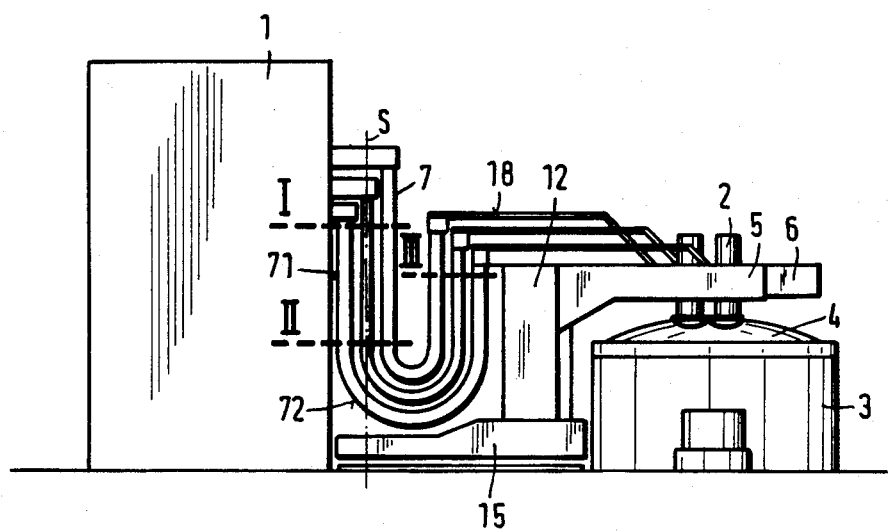
FIG. 2 is a side elevation of the arrangement shown in FIG. 1.

As shown in greater detail in FIG. 2, three flexible conductors 7 which can be subject to torsion are connected one end each to appropriate bus bars 8 which extend from the transformer 1 and with their respective other ends to current bars 18 which in turn are connected to the electrode arms 6. The phase conductors 7 run in a triangulated arrangement. As can be seen in greater detail in FIG. 3, each phase conductor can be deemed to be composed of two sections such as 71 and 72. The first section 71 of a phase conductor is connected to the respective bus bar 8 at connect points 8a and extends substantially vertically down from the connection plan I. Therefore, each section 71 can be deemed to extend vertically between two horizontal planes, I and II. The first plane I runs through the points 8a of connection of the conductor to the respective bus bar 8, the latter extending laterally from the transformer I. The second plane II runs through a particular point within each of the vertical phase sections 71. Sections 72 are direct combinations thereof. FIG. 3a illustrates a sectional view in this plane II indicating that the three conductors 7 form a triangle in that plane.

The second section 72 of each of the conductors runs in, sagging free suspension, essentially from the plane II to a plane III defined by the connection of the conductors 7 to the connecting elements 9 by means of which the conductors are connected to the current bars 18. The connect points 9a extend in a plane II. The contour of the flexible conductors 7 as to suspended depends on the lateral displacement of the connecting points 8 and 9 as well as on the level difference of the two planes II and III. The conductors 7, the bus bars 28 as well as the bus bars 8 are shown in FIGS. 2, 3 and 4 in a manner which is schematic and illustrates merely the fact that there are three of them in each instance. In reality, the bus bars 18 are arranged in a common horizontal plane and the connect points as well as the arrangement of the conductors 7 in any plane transverse to their respective local extension is a triangular one as shown in FIGS. 3a and 3b. The triangle in each instance is specifically defined by the centers of the conductors constituting the corners of equilateral triangles. They could be identical, but that is not essential; what is essential is that the sides have definite relationships to each other, e.g. they are paralled in pairs.

As can be seen from FIG. 3c, the pivot axis S runs through the center of the triangles formed by the three conductors 7, in the planes I and II. Therefore, as the base plate 15 is pivoted about the axis S, the conductors 7 in section 71, undergo a slight twisting displacement which is uniform as to each of the conductors illustrated and is represented by the three arrows in FIG. 3a. Therefore, this slight twist occurs only within the section 71. The freely suspended sections 72, however, find the relative position of the phase conductors, particularly with reference to any cross section through the three conductors, in a constant spacial relationship.

The pivot motion of lid 4 occurs about the pivot pin 13 and covers in the example an angular range of about 60°. One can also say that during this pivot motion, the triangle defined by the three conductors within the plane I remains constant as determined by the connection to the bus bars 8 while the triangle, defined for example specifically by the center of each of the conductors in plane II follows the pivot motion as a whole so that merely a slight twist occurs among the conductors but under retention of their mutual relationship, while the sections 72 of the conductors remains unaffected by the turning motion.

It is particularly important that the triangles as shown in FIG. 3a and in FIG. 3b as they are arranged in the two different planes II and III have a particular spatial relation to each other for optimum results the sides of the triangle are parallel. As the lid 4 is pivoted about the axis S the triangle within the plane II turns on its center because the center is traversed by the pivot axis S. The triangle of the connect points 9a in plane III pivot about the same axis so that the sides of the two equilateral triangles remain in parallel. This then is the geometric reason that on an increment by increment basis, the conductors within the section 72 follow that pivot motion as a whole and do not change their positions in relation to each other.

In order to enforce this situation a particular plate 10 extends from the column 12 and plate 5 which is seen only in FIG. 4, and has triangularly arranged openings traversed by the three conductors 7. These openings will turn as a whole about the axis S and thereby cause the conductors 7 i.e. the point in each instance where the section 71 is combined in the respective section 72 to undergo a slight angular displacement. In view of this arrangement, the actual motion of plate 10 in the range of the conductors or sections 71 is very small and the conductors will move in relation to the plate 10 to a limited extent only. Also, the overall torsional effect is relatively small and will, of course, be smaller the longer section 71 is.

The flexible cables within the section 71 could be replaced by torsion tubes.

The invention is not limited to the embodiments described above; but all changes and modifications thereof, not constituting departures from the spirit and scope of the invention, are intended to be included.

I claim:

1. A current feed system between a transformer and a cover provided for cooperation with two metallurgical vessels and carrying three electrodes, there being means for pivotting the cover about a vertical axis as between covering positions on each of the two vessels, comprising:

a current bus system extending from the transformer and defining three connect points arranged in an equilateral triangle in a first horizontal plane;

three electric conductor means, each including a first section extending down from the three connect points in the first plane, at least to a second horizontal plane;

means for holding the three conductors in a triangular fashion in the second plane underneath the first plane, the pattern also being an equilateral triangle, wherein the conductors extend through the corners of the triangle;

the three conductor means each including a second section respectively extending from the first section and from the second plane in a free sagging and suspension to a third plane;

means in the third plane providing three connect points to the three conductors and being arranged in an equilateral triangle configuration, the latter triangle being such that its sides respectively run parallel to the sides of the triangle in the second plane; and current bar connection means running from the three connect points in the third plane to the electrodes on the cover.

2. A current feed system as in claim 1 wherein the axis runs through centers of the triangles in the first and second plane.

3. A current feed system as in claim 1 wherein the means for pivotting includes a plate having apertures traversed by the three conductor means in the second plane.

* * * * *